United States Patent Office 2,720,455
Patented Oct. 11, 1955

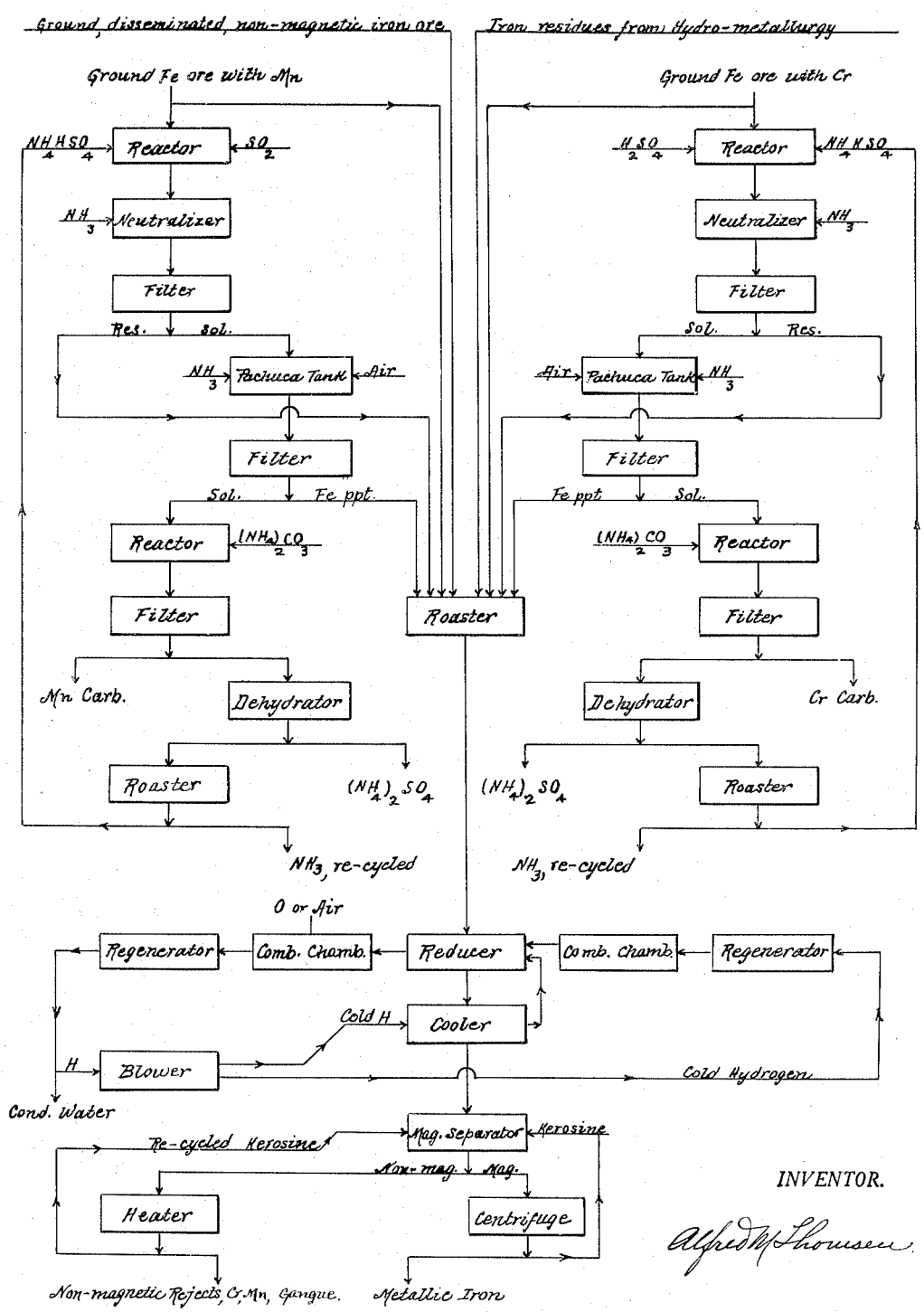

2,720,455

METHOD FOR THE REDUCTION OF OXIDES OF IRON

Alfred M. Thomsen, San Francisco, Calif.

Application July 25, 1951, Serial No. 238,438

7 Claims. (Cl. 75—34)

This application is a continuation, in part, of subject matter disclosed in previous applications bearing the Ser. Nos. 210,477, now Patent 2,662,811; 223,519; and 231,967; in which I have found it necessary to terminate the descriptive matter with the statement that said subjects would be pursued under subsequent applications. An issued patent, No. 2,486,582, bearing the title "Gasifying Carbon" should also be considered as it deals with the cheaper production of gases used in the iron reduction herein described as does also Ser. No. 231,967. Naturally, each of these patents and patent applications is complete in itself and has nothing to do with the reduction of iron but collectively they constitute an economic complex which would not appear except I draw attention to the fact.

The process which I will not describe relates in the first instance to the reduction of iron by a gaseous agent from iron ores of such poor tenor that they are not normally regarded as workable and, further removed, to sundry simple steps whereby ores not even then rendered commercially workable can be so improved as to constitute commercially valuable sources of iron.

As the gaseous reducing agent I prefer hydrogen, but the use of carbon monoxide together with or in place of hydrogen is not excluded. Attention will be called to possible departures from my preferred version at the proper places to include such innovations. The reduction of iron oxide by hydrogen and/or carbon monoxide is, of course, too well known to call for any description herein. It is assumed that the operator is entirely conversant with time, temperature, relative proportion of the reducing agent to the products of such reduction, and all other matters that are concerned in the reduction phase itself.

At approximately the center of the drawing I have indicated a device called a "roaster" into which eight different streams of material are fed while only one is leaving. This is a convenient place to start my process and then to follow through to the end, metallic iron. This roaster may be but a revolving furnace or kiln and serves a number of purposes. It pre-heats the charge to reaction temperatures, removes all free and practically all combined water, breaks up carbonates, and, in general, prepares the ore for the reducing step which takes place in the "reducer," directly below said roaster.

To fulfill this function almost any type of a mechanical roasting furnace suitable for a powdered ore can be used, be it of the kiln type or multiple hearth or other device. As it is to be traversed by a flow of hydrogen it is essential, of course, that it be made gas tight. No means of heating are required, so only the outer steel envelope of the furnace need be considered when the expression "gas tight" is used. The ore has already been heated to reaction temperatures, the same will be true for the hydrogen which is used as the heat carrier of the slightly endothermic reaction involved in the reduction of iron oxide. Orthodox calculations based upon the combining weights of the reacting substances and the heats of formation will be dispensed with as elementary and only the over-all results will be given. It is assumed that reduction takes place within the most favored brackets for the reduction of ferric oxide by hydrogen, namely between 1100° F. and 900° F. If the hydrogen, therefore enter the reducing zone at the top temperature and be so regulated in speed as to leave at the lower temperature then it will have been the heat carrier of the reaction to the extent indicated by the following figures.

Let the unit to which all others be referred be the passage of 100 lbs. of hydrogen at a temperature of 1100° F. A little less than 8% of the hydrogen will then have been oxidized when the temperature has dropped to 900° F. The ratio of hydrogen to water vapor, by volume, in the spent reducing medium will be approximately 10:1, making it for practical purposes still a hydrogen medium. Meanwhile, approximately 140 lbs. of iron will have been reduced to the metallic state. If the gaseous medium be now cooled to approximately atmospheric conditions then most of this water vapor will condense and can thus be removed from the residual hydrogen. A further washing with a spray of cold water, if that be available, can reduce the water content of said hydrogen to about one half of the amount possible without such additional cooling. Such procedure would probably represent an unnecessary refinement.

It will be obvious that the hydrogen after such water removal requires only reheating to the aforementioned initial temperature in order to be in prime condition for re-cycling to the reduction phase. The method by which I perform this heating and cooling in an economic manner will now be described. The cost of the hydrogen, to make it cheap enough for such use, is the subject of the patent and patent applications previously cited.

In the drawing I have shown the reducer placed between two regenerators. To emphasize later on a certain type of heating I have represented said regenerators as having separate combustion chambers but in practice said "combustion chamber" is merely the front part of the regenerator, both purposes being served by the same device. Below the reducer I have placed a "cooler" which is merely a lower part of the reducer traversed by cold hydrogen for the purpose of cooling the reduced iron, the hydrogen finally reaching the reducer in heated condition. It is obvious that said hydrogen from the cooler could join the circulating gas stream anywhere and in whole or in part sent through the regenerators.

The cold hydrogen, circulated by the blower, is thus heated by traverse through the right hand regenerator to approximately 1100° F. The right hand combustion chamber is seen to function solely as a part of the regenerator contributing its quota of stored heat to the traversing hydrogen. In the reducer the temperature is now dropped to about 900° F. by chemical action and the H then passes into the left hand regenerator where sufficient air or oxygen is admitted to restore its temperature to somewhat above the 1100° F. To represent this with the utmost clarity I have shown the separate combustion chamber, which is actually the regenerator itself. Manifestly the amount of additional hydrogen thus burned to secure the necessary heat lost in the reduction will depend entirely on the amount of air or oxygen admitted to the combustion chamber and is thus under absolute control of the operator. So far I have described the flow of hydrogen in the direction indicated by the arrows, counter-clockwise. It is obvious that on reversal of flow, clock-wise, the heat generated in the aforementioned hydrogen combustion and stored in the regenerator will be imparted to the traversing hydrogen gas which will thus be raised to the required temperature.

The amount of hydrogen consumed in this manner is small when compared with the total amount utilized in the iron reduction. Theoretically it would be necessary to burn but a pound of hydrogen for each 8 lbs. consumed in reduction and this in turn would represent 140 lbs. of reduced iron. In practice a larger amount would be required but in any event it will be within reason, and the method described is a convenient one for furnishing the necessary heat.

While air could be substituted for oxygen in burning this hydrogen it would involve considerable dilution with nitrogen. While not shown in the drawing any such cyclic use of hydrogen as indicated therein must provide for a discard of some of the circulating medium as well as a continuous furnish of the total hydrogen consumed and purged. Manifestly, the deliberate introduction of nitrogen would greatly increase the amount thus purged and would probably only be warranted in the event such purged hydrogen-nitrogen mixture were made the source of ammonia. Inasmuch as an extensive use of ammonia enters into sundry of the applications for patent previously cited as well as in the preparation for reduction of certain ores by this process, as will be described later on, it follows that at times such use of air in place of the more expensive oxygen might be justified.

Finally, the use of any additive oxygen may be rendered unnecessary if the technique disclosed in my Patent No. 2,486,582 were used to heat the hydrogen by a few hundred extra degrees after it has traversed the regenerator and before it has entered the reducer. No difficulty will be experienced with valves at the temperatures involved as these are much lower than standard blast furnace practice. The split stove, introduced in the gasifying of carbon, would certainly perform equally well if used to superheat hydrogen that has already been preheated by regeneration.

In view of the importance given to the fact that reduction by hydrogen is almost self-supporting as to heat would seem to indicate that the strictly exothermic reduction with CO would be preferable. I will now cite some disadvantages. At low temperatures for reduction the resultant iron is pyrophoric and even more so if the reducing agent be CO. In addition, considerable carbon is inevitably deposited on said iron making a dangerous combination. In reduction by hydrogen, furthermore, there is an almost complete elimination of sulphur as $H_2S$, and the iron though still pyrophoric is much less so. If after reduction it be heated to over 800° C., or better to 1000° C. all such characteristics are permanently removed.

I have overcome these objections by discharging the reduced ore into a liquid medium free from oxygen, a relatively non-volatile hydrocarbon of the kerosene type serving very well. In such a medium magnetic separation can be successfully used to separate iron from gangue minerals and as the previous treatment has made the iron malleable and the gangue minerals more friable a subsequent reduction in size of the particles of impurities and their liberation from the iron component becomes simple. Final separation of the iron is also facilitated by the low surface tension of such a medium and the final result is an extremely pure form of iron.

On the drawing I have shown a centrifuge used as the means of separating the adherent kerosene from the iron particles but other means could, of course, be used. In any event, even though only a small fraction of one percent of residual hydrocarbon remain yet such a film is adequate to protect the iron from oxidation. If it be now subjected to the hydraulic press it will be compacted into solid billets retaining at the most ounces, or less, of the hydrocarbon per ton of iron. Such material is evidently a prime furnish for the open hearth or the electric furnace and thus permits the blast furnace to be side stepped entirely.

If the ore be pure enough to start with and if this reduction and magnetic separation be executed with sufficient care it is entirely possible that such billets can be heated and rolled directly thus keeping the iron in the solid phase throughout with elimination of even the melting stage before specified. In fact, it would constitute a molding powder for direct application in that branch of the industry. I am aware that such iron is universally reduced at higher temperatures, or heated to such temperatures after reduction that the undesirable pyrophoric properties are eliminated, but I believe that a film of a neutral hydrocarbon will do as much.

Manifestly, the determining feature in this latter case is the actual thickness of said protective film. It would doubtless be desirable to have this rather heavy if long storage is contemplated but at the time of use it should evidently be reduced to a minimum. This removal can be effected by washing the powder with an appropriate solvent for the hydrocarbon, such as acetone, and then drying the washed powder. In this manner the film can be entirely removed, if desired, or by deliberately leaving a small amount of said hydrocarbon in the last wash the thickness of the residual film can be directly controlled.

It is also obvious that deposited carbon, such as would result from the presence of CO in the reducing gas, would be superficially removed from the reduced iron particles by such "kerosene technique" and only that carbon deposited within the pores of said iron would remain. It is quite possible, therefore, that subsequent use of kerosene will permit of the substitution of CO for H, in whole or in part, in my process of iron reduction thus making use directly of my Patent No. 2,486,582 instead of regarding it solely as an initial step in the production of hydrogen.

It is, of course, essential that the kerosine in which the non-magnetic rejects are suspended be recovered as completely as possible. The bulk of the liquid will be separated by filter or centrifuge, an operation not shown on the drawing, and the residual only will be heated as shown to volatilize the hydrocarbon. After condensation such kerosine is returned to the circuit. It is thus seen that kerosine losses can be made as small as desired.

If the ore reduced contain any appreciable amounts of Cr or Mn, particularly if not too intimately associated, chemically, with the iron component such material will become concentrated in the rejects which may then be recycled to the head of the process for the recovery of such Cr and Mn. Raw ores, containing much Cr and/or Mn, particularly if such association be very intimate, must be given a pre-treatment for the removal of such metals before reduction. These steps will now be described.

I have already referred to the eight types of ore represented as entering the roaster. A ninth might have been added in the form of the pure iron oxide, such as that produced by igniting that pure ferrous carbonate precipitated from a crystallized ferrous ammonium sulphate described in Ser. No. 231,967. In view of the fact that such pure material would not require any magnetic treatment it was deemed more suitable to merely mention and not delineate such material.

The two central streams entering the roaster are labeled "Ground, disseminated, non-magnetic iron ore" and "Iron residues from hydro-metallurgy," respectively. The first designation is self explanatory. By the second classification I allude to such iron products as are discarded from my Patent No. 2,111,951, or from Ser. No. 210,477. Such material will always be in the form of a fine powder and has been thoroughly purified by chemical processing so it is directly amenable to the reduction procedure.

Next I have shown ores with Cr and/or Mn. If the amount of Cr and Mn be small then such ore is reduced directly as has just been described. This is indicated by the streams immediately to the right and left of the two previously described. Though not shown on the drawing I have already indicated that the rejects would be recycled through the chemical steps now to be described.

To remove manganese I treat the ore with $SO_2$, a very old and well known proposal. Manganese often appears in ores as a binding material between gangue and iron minerals, and on solution of said manganese considerable liberation of iron particles takes place, thus facilitating subsequent magnetic separation of the iron after reduction. That however is but the first step in said treatment. The resultant manganese solution will also contain some iron, and, of course, free acid. It is first neutralized with ammonia and filtered, the filter cake being sent to the reduction stage as indicated on the drawing.

The solution is next oxidized with air and additional ammonia added to precipitate the ferric iron and again filtered. This iron precipitate I have once more shown as sent to the reduction stage, being represented by the extreme left hand stream going to the roaster. The relatively pure manganese-ammonia sulpate solution resulting is next precipitated with carbonated ammonia which gives a granular, easily filtered product and a final solution of ammonium sulphate. Such use of $SO_2$ as herein described does not result in the formation of manganese sulphate alone, but lower oxides of manganese produce the corresponding di-thionates. I have therefore shown a further use of a part of the ammonium sulphate by dehydration and conversion to the bi-sulphate, the latter salt being recycled to the $SO_2$ reaction stage. Di-thionates are thus decomposed with liberation of $SO_2$ which in turn attacks another increment of manganese.

I have thus shown a way in which the total amount of chemicals needed for such iron purification is returned as a commercial product for which there is an extensive market, namely, ammonium sulphate. I have also shown the objectionable manganese recovered as a substantially pure carbonate. Inasmuch as the main use for such manganese is in the production of ferro-manganese and as this requires a conventional 8:1 ratio it would be useless to remove iron below this ratio unless the use of the final product be as a "sweetener" of poorer ores.

I will now describe how I treat an ore containing chromium, this being represented on the right-hand side of the drawing as the manganese picture was represented on the left-hand side. The operation is substantially the same as manganese operation with the substitution of sulphuric acid for sulphur dioxide but the technique is radically different. Instead of commingling a powdered ore with a water solution of $SO_2$ the ore is now mixed with strong sulphuric acid and allowed to harden through crystallization of the salts produced by the reaction. This is analogous to the manufacture of super-phosphate. The reaction is somewhat selective for iron but much chromium will also dissolve when the sulphated product is dissolved in water, neutralized and filtered. The separation of this iron from the chromium, in an identical manner to that already recited in manganese separation, is next recited and the iron-free solution is then precipitated with carbonated ammonia as in the case of manganese. Both the residue from sulphating and the iron precipitate are then sent to the reduction phase. After the subsequent magnetic separation the non-magnetic rejects will be found much richer in chromium than the original ore and the precipitated chromium carbonate can then be added to any extent desired or needed to conform to the conventional 3:1 ratio.

The object achieved is thus seen to be identical with the manganese version; to wit: The contained metals, iron and chromium, are both obtained in merchantable form and the chemicals required in the operation are salvaged as ammonium sulphate. I have also indicated herein the conversion of a part of the ammonium sulphate to the bi-sulphate with recycling as a means of reducing the relative amount of ammonium sulphate produced in my process for while the market for ammonium sulphate is large it is not unlimited and such ores as herein described are quite abundant in continental United States. Manifestly, as decomposition of ammonium sulphate starts at temperatures below that achieved in sulphating, it is quite possible to re-cycle the ammonium sulphate as such and permit the conversion to bisulphate and subsequent entrance into the sulphating reaction to take place simultaneously.

Minor variations within the scope of this disclosure are multitudinous and will often be self-evident. Thus if a pyrrhotite, containing only sulphur and iron and thus unfit for hydrometallurgy, be roasted with sufficient care to insure a sulphur elimination then such a roasted sulphide could be subjected at once to reduction and purification by magnetic separation. Manganese can be put in solution by the same method described under chromium separation. Basic slag, particularly if unfit for direct use as a fertilizer, can be thus separated into phosphoric acid and its lime, manganese and iron components obtained separate and distinct from one another without calling for anything but the process herein disclosed with such variations as would suggest itself to any skilled operator. Manifestly, the cyclic use of bisulphate has many applications. Conversion of phosphate rock into ammonium phosphate with separation of the resident lime as the carbonate would constitute a notable departure from present day practice.

Having thus fully described my process, I claim:

1. The method of reducing iron oxide to metallic iron which comprises; traversing a body of oxide of iron while maintained in a state of motion, alternately, in opposite direction, by a gaseous reducing medium heated to reaction temperatures; burning a sufficient portion of said reducing medium by the addition of a sufficient amount of oxygen, after complete passage through the iron oxide undergoing reduction and before entering the heat accumulator, thus raising the temperature of said gaseous medium to a temperature higher than that at which it entered the reducing phase; storing such resident heat in a heat accumulator; stripping the gas after such cooling of such products of reduction as remain commingled with said gas; reheating the gas after such purification by conveying to it the heat previously abstracted therefrom and stored in the before mentioned heat accumulator; thus restoring it to its initial temperature for reduction; and repeating the same sequence of operations on each reversal of flow.

2. The method of iron reduction set forth in claim 1, with the added step that the reduced iron produced therein be cooled by direct contact with the cold purified reducing medium as a preliminary step in heating said purified reducing medium to reducing temperatures.

3. The method of iron reduction set forth in claim 1, with the added step that the reduced iron produced therein be commingled with a mobile, neutral liquid having no effect upon said reduced iron, while still protected from oxidation by the enveloping reducing gaseous medium.

4. The method of direct manufacture of iron from its ores which comprises; converting any non-oxide iron content to oxide by roasting; reducing said oxide to metal by means of a gaseous reducing medium; commingling said reduced iron ore with a mobile neutral liquid having no action on the reduced iron; separating the resultant magma into a magnetic and a non-magnetic portion; recovering the retained neutral fluid in both portions from such separation and re-cycling said fluid.

5. The method of direct manufacture of iron set forth in claim 4, with the added step that the magma described therein be subjected to sufficient mechanical violence to further liberate the malleable from the non-malleable ingredients thereof prior to magnetic separation, thus obtaining a product higher in iron content as the accepted portion.

6. The method of direct manufacture of iron set forth in claim 4, with the added step that the powdered iron yielded thereby be directly compacted by pressure to yield a compact form of iron suitable for rolling without having passed through a liquid phase.

7. The method of direct manufacture of iron from its ores which comprises; reducing the iron oxide in said ore to metallic iron as set forth in claim 1, using hydrogen as the gaseous reducing medium; commingling said reduced ore with a mobile neutral liquid having no effect on the reduced iron; separating the resultant magma into a magnetic and a non-magnetic portion; compacting the magnetic portion by pressure; recovering the neutral liquid retained in both portions and re-cycling said liquid.

References Cited in the file of this patent

UNITED STATES PATENTS

| | | |
|---|---|---|
| 573,741 | Whitacre et al. | Dec. 22, 1896 |
| 2,074,013 | Bradley | Mar. 16, 1937 |
| 2,199,654 | Simpson | May 7, 1940 |
| 2,200,369 | Klinker | May 14, 1940 |
| 2,334,434 | Patterson | Nov. 16, 1943 |
| 2,461,396 | Raney | Feb. 8, 1949 |
| 2,470,106 | Parry | May 17, 1949 |
| 2,577,730 | Benedict et al. | Dec. 11, 1951 |
| 2,609,288 | Stuart | Sept. 2, 1952 |